United States Patent Office 2,715,012
Patented Aug. 9, 1955

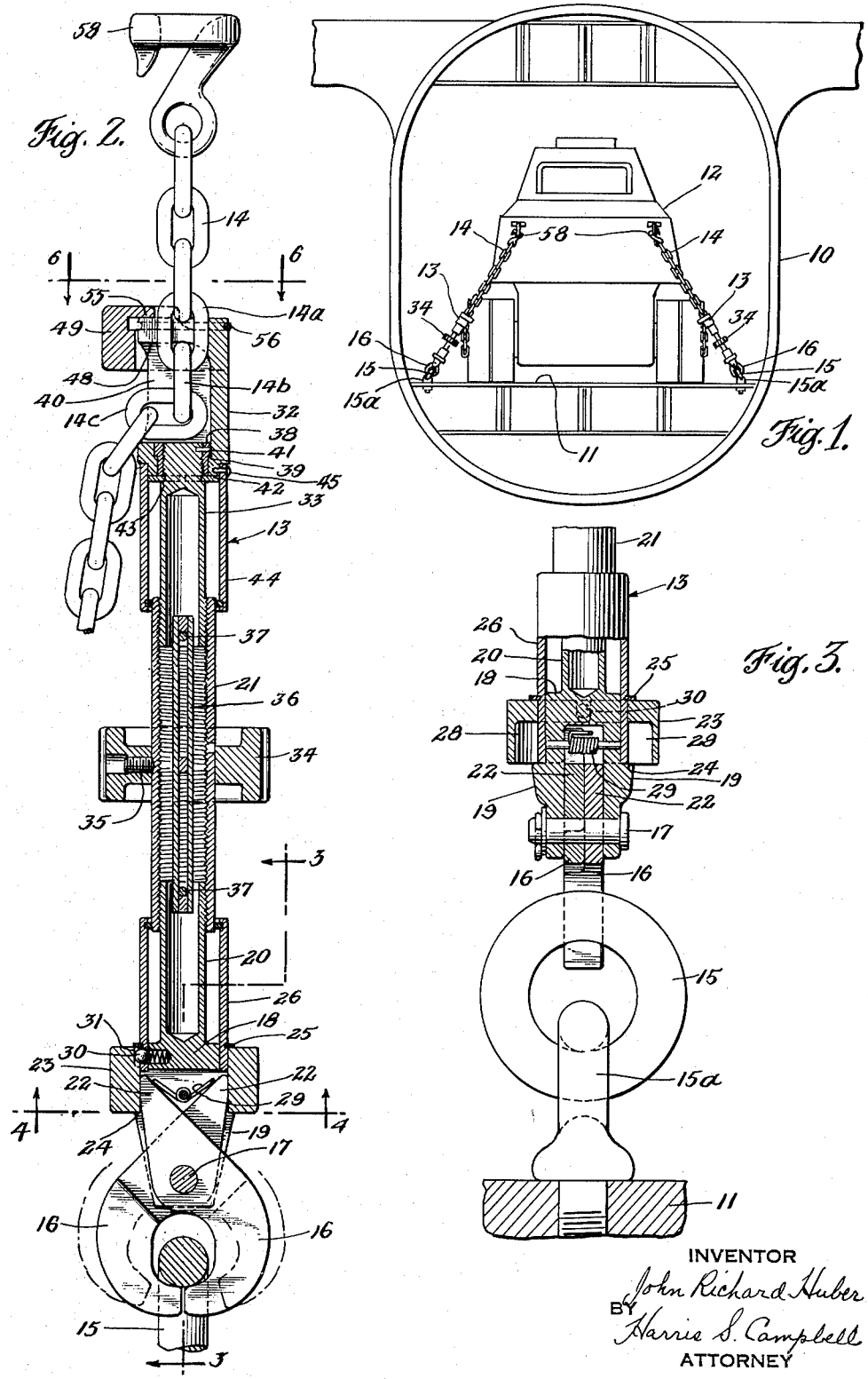

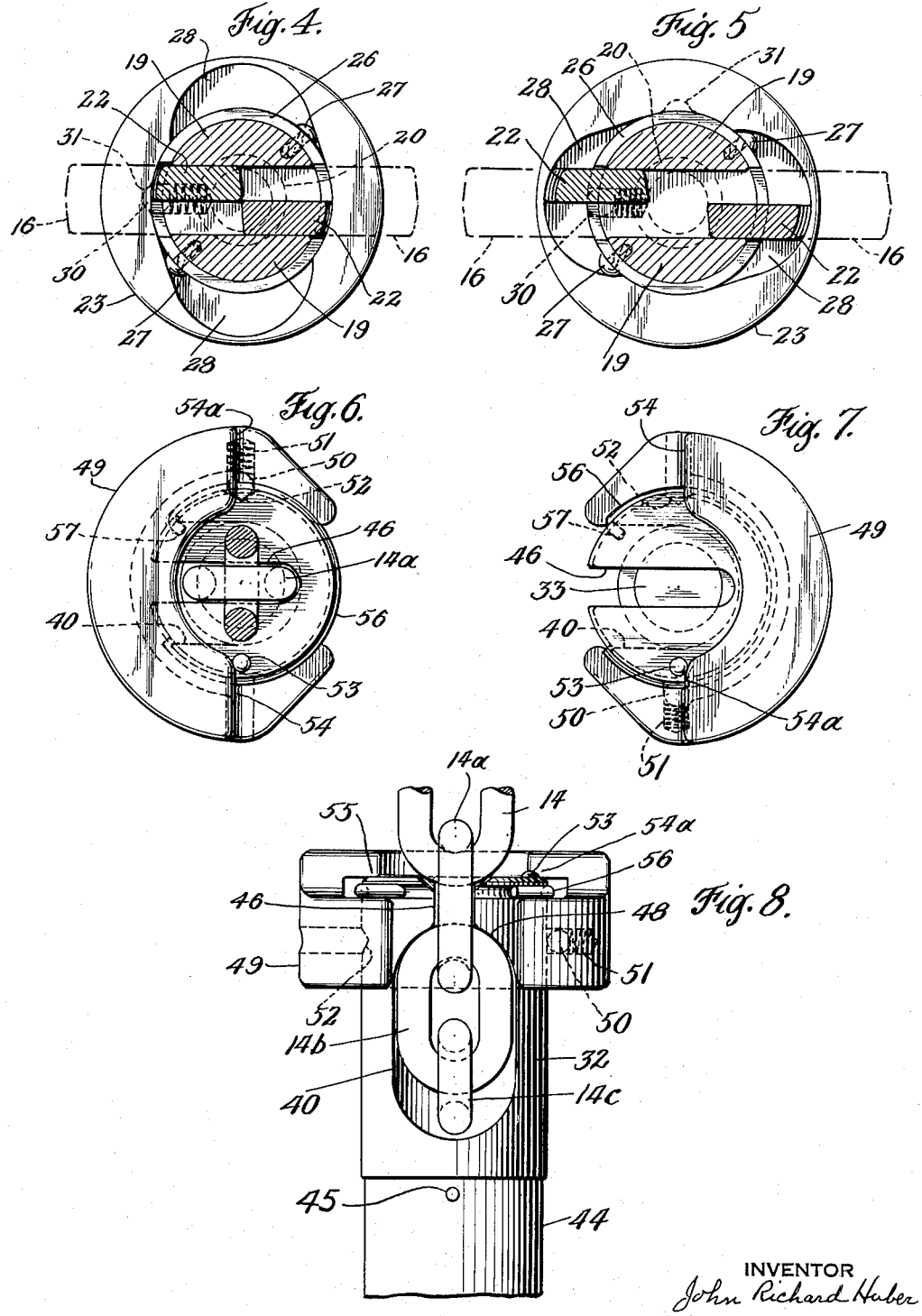

2,715,012

CARGO TIE DOWN DEVICE

John Richard Huber, Warrington, Pa., assignor to Eastern Rotorcraft Corporation, Neshaminy, Pa., a corporation of Pennsylvania Application May 12, 1951, Serial No. 226,051

8 Claims. (Cl. 254—67)

This invention relates to cargo tiedown devices which are particularly adapted for retaining heavy pieces of cargo or equipment while being transported in a vehicle.

In order to prevent movements of heavy items during shipment it is necessary to lash them down to the vehicle to prevent acceleration forces from shifting their position in the vehicle. Such securing requirements are particularly important in connection with aircraft in which acceleration forces may be developed in many different directions and in which a shift of cargo position is particularly undesirable inasmuch as it can cause detrimental change in the center of gravity position of the aircraft.

In securing heavy cargo and equipment such, for example, as a motor truck being transported in an aircraft, large capacity retaining elements are preferably used in order to reduce the number of securing elements to a minimum and thus reduce the time required in loading and unloading. For this purpose it is customary to use a tension member such as a length of chain which is attached to a tensioning device anchored to the floor or other suitable portion of the structure. The tensioning device is used to remove all slack and apply an initial tension to the tension member to reduce incidental movement of the secured article. When using a chain in this manner, it is sometimes twisted at least a portion of a turn. When tension is applied to a twisted chain of this nature a large torsional moment can be developed which is transmitted from the chain to the anchoring and tensioning device. Such torsional moments are undesirable inasmuch as they tend to cause rotation of the tensioning device which usually incorporates a threaded tightening member.

It is an object of the present invention to provide a construction for the tensioning device which prevents the development and transmission of torsional moments from a chain member to the tensioning device, thereby protecting the mechanism of the tensioning device from damage or malfunctioning due to adverse torsional moments.

A further object of the invention is the provision of a threaded typetensioning device having a swivel terminal of simple construction and arranged for positive locking of the swivel supported parts.

Another object of the invention is the provision of a tensioning device terminal suitable for engaging the link of a chain, the construction of which is simplified to provide a material reduction in the cost of manufacture.

A further object of the invention is the provision of improved chain engaging and locking structure.

A still further object is to provide improved anchoring mechanism for the tightening device with provision for fast operating jaws which may be opened or closed by a rotatable cam member.

Other objects and advantages of the present invention will be clear from the following description of the drawing in which—

Figure 1 is a sectional view through a transport type aircraft illustrating one manner in which the apparatus of the present invention is used to secure heavy equipment in position.

Figure 2 is an enlarged view showing the tiedown apparatus of the present invention.

Figure 3 is a fragmentary sectional view taken substantially on the line 3—3, Figure 2.

Figure 4 is an enlarged sectional view taken on the line 4—4 of Figure 2, showing the jaw-locking mechanism in closed position.

Figure 5 is a view similar to Figure 4 but showing the jaw-locking mechanism in released position.

Figure 6 is a sectional view taken on the line 6—6, Figure 2, showing the chain-lock mechanism in locked position.

Figure 7 is a view similar to Figure 6, showing the chain-lock mechanism in open position.

Figure 8 is a fragmentary elevational view looking toward the right in Figure 2, of the upper or chain locking portion of the apparatus showing the chain-lock mechanism in open position.

In Figure 1 an aircraft fuselage 10 is illustrated having a floor 11. A heavy vehicle 12 is shown being transported in the aircraft and being held in position by means of tiedown devices 13 which include tension members in the form of chains 14. One end of the tiedown chain 14 is secured to the vehicle 12 at a suitable connecting point and the opposite end of the tiedown device at the lower end of the tensioning apparatus 13 is secured to a suitable ring 15, or other fastening device, connected to the aircraft structure. The vehicle may be quickly secured in position in this fashion as will be clearly seen from the following description of the details of the tiedown mechanism.

As will be seen from Figures 2 and 3, the tensioning device 13 includes a pair of jaws 16 which are mounted by means of pivot 17 in a terminal member 18 of the tensioning apparatus. The jaws 16 are suitably shaped to engage the anchor ring 15 which is attached to the aircraft structure in any suitable manner such as by the threaded eye-bolt 15a. The terminal structure 18 which supports the jaws 16, includes a pair of fork legs 19 through which the pin 17 extends to provide for pivotal movement of the jaws. The fork legs 19 are in turn attached to the shank member 20 which terminates in a threaded portion which engages a female thread in barrel member 21. The jaws 16 have legs 22 which extend on the opposite side of pivot 17 from the jaw members proper. These extensions 22 lie inside the slot formed by the two fork legs 19 of the terminal structure 18 and are retained in position to maintain the jaws 16 closed by means of a manually operated locking ring 23.

The locking ring 23 is maintained in correct longitudinal position with respect to the terminal member 18 by means of the shoulder 24 at the lower end and snap ring 25 at the upper end. Snap ring 25 is engaged in a groove in a cylindrical cover member 26 which in turn is attached to the terminal member 18 by means of a screw or screws 27. This construction will be clear by reference to Figures 4 and 5.

To release the jaws 16 from the anchoring member whether the tiedown device is under tension or not, the ring 23 is rotated from the position illustrated in Figure 4 to that shown in Figure 5. This permits the extension legs 22 of the jaws to open out into the pockets 28 in the ring 23 with the result that the jaws move to open position. A small spring 29 which reacts between the legs 22 causes positive opening of the jaws when the ring is rotated to released position. It will be noted from Figures 4 and 5 that the pockets 28 are shaped to provide a tangential relationship for the side of each pocket which engages the jaw legs 22 during the closing rotation. This shape gives a smooth and powerful action during the action of opening and closing the jaws. A spring loaded ball 30 is mounted in the terminal member 18 and engages in a suitable depression 31 in the ring 23 when the ring is in locked position. Thus the ring is prevented from accidental movement away from the locked position. Screws 27 also serve to act as position stops for the ring 23 in open or closed position.

Referring now to Figures 2, 6, 7 and 8, it will be evident that the chain member 14 is connected to the upper end of the tensioning apparatus 13 by means of a terminal chain pocket member 32. Chain pocket member 32 is in turn connected to threaded terminal 33 by means of a swivelling or rotating joint which permits the transfer of tension loads between members 32 and 33 but prevents any appreciable torsional forces from being transferred. As will be evident, the terminal member 33 is connected to the opposite end of barrel 21 from the terminal structure 18. Rotation of the barrel 21 may be accomplished by turning the hand knob 34 which is firmly connected to the barrel 21 by means of a set screw 35. It should be noted that the threaded connection of member 33 to barrel 21 has an opposite hand thread. Thus rotation of the knob 34 in one direction will cause shortening of the tensioning device 13 while rotation in the opposite direction will cause lengthening. A slotted member 36 is connected to terminal barrel 20 and terminal barrel 33 by means of pins 37. This construction assures that the two threaded terminals 18 and 33 will always retain their proper relative position to each other in a torsional sense and thus, will always maintain the same relative axial motion when the barrel 21 is rotated.

The rotatable connection between the threaded terminal 33 and the chain pocket 32 is accomplished by the use of a threaded nut device 38 having a shoulder 39 which engages a corresponding internal shoulder on the chain pocket 32, thus providing for the transfer of thrust between these members. The assembly of terminal 33 and 32 is accomplished by inserting member 33 through the opening at the lower end of pocket 32 after which the threaded nut 38 may be inserted into the aperture or cavity 40 in the chain pocket 32 and threaded on to the upper end of terminal 33. Lock pin 41 is then inserted and the member 33 is drawn out into position. A split washer 42 fits into groove 43 and prevents axial movement of the part 33 with respect to terminal 32. The split washer 42 is retained in assembled relationship by means of the cylindrical dirt excluding cover 44 which is attached to the chain pocket terminal 32 by means of suitable screws 45.

The chain pocket 32 is shaped to retain the particular type of chain being used as the tensioning member. As will be clear from Figures 2, 6, 7 and 8, the chain receiving member 32 is a generally cylindrically shaped body with the upper end closed except for a slot 46 through which a link 14a may be inserted. With link 14a in position in slot 46, the next lower link 14b lies in the main cavity 40 of the barrel member 32. This cavity 40 has an upper surface 48 which is shaped in rounded fashion to engage the end of link 14b and thus transfers the tension load which may be carried by the chain into the chain receiving member 32 from where it is transferred through the tightening mechanism to the anchoring ring 15. The pocket cavity, as will be clearly seen from Figure 2, is of sufficient length to permit the next lower link 14c to extend laterally at the lower end of the cavity 40 and thus, the unused end of the chain may lie outside the tiedown apparatus, and in case there is considerable unused chain this may be readily disposed of in a neat pile on the floor of the carrier vehicle.

In order to lock the chain in its operating position, a rotatable lock member 49 is mounted on the upper end of the chain engaging member 32. The chain lock member 49 is shown in closed position in Figure 6, where it will be seen that a spring loaded ball 50, which is mounted in cavity 51 in the lock member 49, may enter a suitably located depression 52 in the upper end of the chain pocket 32. Thus, in closed position, the lock 49 is prevented from being accidentally rotated out of position. However, with a slight positive effort, rotation of the chain pocket to its open position as illustrated in Figures 7 and 8 may be accomplished. In this position, the chain may be removed or placed in position in the chain pocket. A small screw 53 is placed in the upper end of the chain supporting member 32 to act as a stop for the closed and open positions of the chain lock 49, shoulders 54 and 54a being provided for engagement against the stop 53. The chain lock is held against longitudinal displacement with respect to the chain receiving member 32 by means of shoulder 55 and lock wire 56, which engages a suitable groove near the upper end of member 32, there being a drilled hole 57 to receive the end of the lock wire 56 to prevent it from rotational displacement in its groove.

The use of the securing and tensioning device of the present invention is relatively simple. In order to retain a heavy piece of equipment in position, the chain 14 may be first attached to some suitable point on the piece of equipment, the grab hook 58 being useful for this purpose inasmuch as the end of the chain may be wrapped around any suitable attachment structure and the grab hook engaged in one of the chain links to form a loop. The tiedown tensioning device 13 may then be attached to the nearest anchor point such as the ring 15 by slipping the open jaws 16 over the ring and then rotating the jaw closing ring 23 to closed position, thus locking the jaws securely to the ring 15. The tensioning apparatus is preferably adjusted to its extended position and then the loose end of chain 14 is stretched by hand until the most convenient link is placed in the chain pocket 40 of the chain receiving member 32. With the chain in position, the chain lock 49 is then rotated to closed position. Initial tension to prevent any appreciable shifting of the load is then applied to the chain by rotation of the hand knob 34. In this way, any slight amount of slack in the chain is removed and an initial tensioning applied to it.

For unloading, the tiedown equipment may be quickly removed merely by rotating the jaw release member 23. The tiedown is immediately released from the load regardless of whether there is tension in the device or not. The chain may then be quickly removed from the equipment to which it was attached and the unloading operation may proceed without delay. In case the chain has a twist in it, a high tension load such as may occur during flight, can cause extremely high torsional stresses in the tensioning device. The swivel connection prevents such stresses from developing as it permits the terminal 32 to rotate with respect to the tensioning mechanism and thus prevents damage or torsional movement of the tensioning parts.

From the foregoing description, it will be evident that I have produced an improved tiedown apparatus which is constructed to provide simplicity of operation and permits the securing of equipment during transit with a minimum loss of time for both the securing and releasing operations. The unique chain connecting mechanism provides for engaging the nearest convenient link for the correct tension, so that the tensioning mechanism requires a minimum amount of adjustment. The maximum adjustment required is the length of one link plus the movement required for applying the initial tension. The connection of the chain attaching member to the tiedown apparatus proper by means of a swivelling joint prevents the transfer of torsional forces which are produced when a twisted chain is tightened. Thus, the internal mechanism of the apparatus which provides for maintaining the tightening screws in proper relative position to each other is protected. In addition, an improved anchoring and release mechanism is incorporated in the form of jaws having extensions which react against the internal walls of a suitably shaped rotational collar. This rotational locking device provides for a fast acting and reliable mechanism which permits easy release even under conditions of high tension in the mechanism.

I claim:

1. For a cargo securing device, a tension member in the form of a linked chain, a tightening apparatus having a pair of threaded terminal members, a threaded barrel member for connecting said terminal members and providing an adjustment for length, internal connecting structure between said terminal members to prevent relative rotation thereof, a chain connecting terminal attached to one of said threaded terminals, said chain terminal having a pocket opening from one side only and proportioned to fit a link of the chain member, said chain terminal being connected to said threaded terminal member by means of a rotatable connection having complementary shoulders on said chain terminal and said threaded terminal for transferring thrust forces.

2. Apparatus for securing cargo during transit adapted for use with a chain member, a tightening device having provision at one end thereof for attachment to an anchor structure, threaded terminal members having right and left hand threads, a threaded barrel member having right and left hand threads for engaging said terminal members and producing lengthening and shortening action by relative rotation with respect to said terminal members, an internal structure engaging said terminal members to prevent relative rotation of said terminal members with respect to each other, and a chain engaging terminal attached to one of said first mentioned threaded terminal members by means of a swivelling connection.

3. For a cargo securing device having a chain tension member, a tightening device including a plurality of threaded members for producing the tightening action, a chain engaging terminal having a generally cylindrical shape with a cavity therein shaped to fit one of the links of said chain member, said chain engaging terminal being connected to one of said threaded members by means of a rotatable connection, said connection incorporating a threaded nut member adapted to engage the end of said threaded tightening member and having a thrust shoulder associated therewith, a cooperating thrust shoulder at one end of said chain engaging terminal, a pin for locking said nut member to said threaded adjusting member, a split washer adapted to engage a groove between said threaded tightening member and said nut member, and a cylindrical cover having an inside dimension which will permit it to pass over said split washer, said cover being attached to said chain engaging terminal.

4. For a cargo tiedown device having a chain tension element, a tightening device having an anchor terminal member, a second terminal member, said terminal members having an internal interconnecting structure for preventing relative rotation, one of said terminals having a right hand thread and the other having a left hand thread, a rotatable threaded member interconnecting said terminal members and having cooperating right and left hand threads, a chain engaging part rotatably attached to said second terminal member.

5. For a cargo tiedown device having a tension member and a tightening device, said tightening device having a threaded terminal member for engaging the tension member, anchoring mechanism including a threaded terminal fork member, a threaded barrel member for engaging said terminal members to cause tightening action upon rotation of said barrel member with respect to said terminal members, said anchoring mechanism including a pair of curved jaws pivotally attached to said terminal fork member by a single pivot member and having extension legs projecting into said fork member, a rotatable ring element rotatably supported around said fork member, said ring element having an internal shape adapted to engage said extension legs for opening and closing said jaws, the internal shape including a circular portion for engaging said terminal fork member and a pair of tangential wall surfaces extending from the circular portion and forming internal cam surfaces which engage said extension legs for closing action upon rotation of said ring element.

6. For a cargo securing device having a chain tension member, a turnbuckle-type tightening apparatus incorporating an anchor hook mechanism at one end, a chain engaging member connected to the other end of said turnbuckle apparatus by means of a swivelling joint having a rotational axis along the longitudinal axis of said apparatus, said swivelling joint having a threaded shank on the chain member end of said turnbuckle apparatus, said chain engaging member having a hole at one end, said threaded shank extending through said hole and a nut member threaded on said threaded shank after it has passed through the hole in the chain engaging member.

7. A tensioning device having a quick release terminal incorporating a fork member having a shank with a pair of fork legs extending therefrom, a pair of jaws supported by a common pivot pin extending through said fork legs near the outer ends thereof, one end of each of said jaws extending beyond said fork legs and being shaped to engage an attaching member, the other ends of said jaws being formed to extend from the pivot pin toward said shank, a collar rotatably mounted around said fork member and having an internal cam surface to engage the end of each of said jaws inside said fork member, said collar being rotatable to one position to hold said jaws closed and to another position to allow said jaws to open, said cam having a locking portion positively preventing opening movement of the jaws while in its first mentioned position.

8. For a retention device using a chain, an anchoring terminal, adjustable mechanism and a chain engaging terminal having a cylindrical form, said chain terminal having a pocket opening from one side and proportioned to encompass the periphery of a chain link, one end of the cylindrical terminal being attached to the adjustable mechanism, the external end of the cylindrical terminal having a slot having a width to fit the diameter of the rod from which the chain links are formed, a collar having a side opening mounted at the external end of said cylindrical terminal for rotational movement to lock a chain link in position in the slot, said collar having a flange engaging the external end of the cylindrical terminal and having an internal groove adjacent thereto, said cylindrical terminal having a groove adjacent its end, and a locking ring supported in said groove, said ring having retention means for preventing rotational movement in said groove.

References Cited in the file of this patent

UNITED STATES PATENTS

| | | |
|---|---|---|
| 407,559 | Wells | July 23, 1889 |
| 580,905 | Shank | Apr. 20, 1897 |
| 609,478 | Sturgis | Aug. 23, 1898 |
| 801,722 | Lane | Oct. 19, 1905 |
| 909,352 | Wheeler | Jan. 12, 1909 |
| 1,179,951 | Moore | Apr. 18, 1916 |
| 1,201,146 | Cerney | Oct. 10, 1916 |
| 1,280,163 | Clarkson | Oct. 1, 1918 |
| 1,313,450 | Beals | Aug. 19, 1919 |
| 1,346,022 | Hassel | July 6, 1920 |
| 1,543,467 | Wrigley | June 23, 1925 |
| 2,179,564 | Smith | Nov. 14, 1939 |
| 2,353,017 | Denton | July 4, 1944 |
| 2,363,392 | Buquor | Nov. 21, 1944 |
| 2,560,695 | Huber | July 17, 1951 |